United States Patent [19]

Ohta

[11] Patent Number: 4,910,394
[45] Date of Patent: Mar. 20, 1990

[54] TRANSDUCER FOR CONVERTING A SIGNAL TO READ OUT DATA AND METHOD FOR FORMING THE SAME

[75] Inventor: Toshihiko Ohta, Yokohama, Japan

[73] Assignee: Kabushiki Kaisha Toshiba, Kawasaki, Japan

[21] Appl. No.: 152,391

[22] Filed: Feb. 4, 1988

[30] Foreign Application Priority Data

Feb. 6, 1987 [JP] Japan .................................. 62-25731

[51] Int. Cl.⁴ ........................ G06K 7/08; G06K 19/06
[52] U.S. Cl. .................................. 235/492; 235/449; 235/493; 235/448
[58] Field of Search ............... 235/493, 492, 487, 488, 235/380, 449, 439; 360/123, 122, 125

[56] References Cited

U.S. PATENT DOCUMENTS

| | | | |
|---|---|---|---|
| 3,798,059 | 3/1974 | Astle et al. | 29/608 |
| 4,065,797 | 12/1977 | Nomura et al. | 360/122 |
| 4,310,821 | 1/1982 | Frances | 360/123 |
| 4,550,353 | 10/1985 | Hirai et al. | 360/125 |
| 4,583,143 | 4/1986 | Tabei | 360/125 |
| 4,605,844 | 8/1986 | Haggan | 235/492 |
| 4,713,711 | 12/1987 | Jones et al. | 360/125 |
| 4,751,599 | 6/1988 | Katou | 360/123 |
| 4,791,283 | 12/1988 | Burkhardt | 235/492 |
| 4,791,285 | 12/1988 | Ohki | 235/493 |
| 4,803,350 | 2/1989 | Izawa et al. | 235/492 |

FOREIGN PATENT DOCUMENTS 57-52620 11/1982 Japan .
WO86/04705 8/1986 World Int. Prop. O. .

Primary Examiner—Vincent P. Cannery
Assistant Examiner—Robert A. Weinhardt
Attorney, Agent, or Firm—Cushman, Darby & Cushman

[57] ABSTRACT

A transducer for an IC card having a built-in semiconductor memory performs signal conversion by magnetic coupling to read out data. This transducer comprises a substrate, which has a first section of a predetermined thickness, and a second section, thinner than and formed in contact with the first section. A pair of first thin-film spiral coils, both would in the same direction, are formed on the first section of the substrate, and thin-film connection pads, respectively coupled to the first spiral coils, are formed on the second section. Then, an insulating film is deposited on the substrate and the first spiral coil. Through holes are made in the insulating film, thus exposing the center portion of the first spiral coil. A pair of second thin-film spiral coils, both also would in the same direction, are formed on the insulating film such that they are coupled to the first spiral coils. An anisotropic conductive film, for supplying a signal from the memory, is coupled to the pads by means of the through holes.

13 Claims, 3 Drawing Sheets

TRANSDUCER FOR CONVERTING A SIGNAL TO READ OUT DATA AND METHOD FOR FORMING THE SAME

BACKGROUND OF THE INVENTION

I. Field of the Invention

The present invention relates to a transducer and a method of forming the same, and more particularly, to the improvement of a transducer for converting a signal, output from a semiconductor memory incorporated in a reading apparatus, to be sent to an electromagnetic head of the reading apparatus, and a method of forming the same.

II. Description of the related art including information disclosed under §§1.97-1.99

Recently, IC (Integrated Circuit) cards have been developed which include a built-in large capacity semiconductor memory which performs a variety of data processing operations. Conventionally, reading out data stored in such a semiconductor memory requires that the electric terminals of an external unit serving as a data reader contact the terminals formed on the IC card. The more frequently the card is connected to, and disconnected from, the external unit, the greater the wear of the terminals of the unit and the IC card. When the terminals are worn to a certain extent, sparks will likely be generated as the IC card is connected to, or disconnected from, the external unit. Such sparks damage the IC card, rendering it less reliable than before. The following coupling method has been proposed as a means of overcoming this problem:

An electric signal generated inside an IC card is temporarily converted into a magnetic signal, which in turn is read by an electromagnetic converter incorporated in the external unit and having a read coil. This is known as a non-contact readout method. The IC card and the external electromagnetic converter each have a plurality of coils in addition to the read coil, such as a write coil, a read/write coil and a power clock coil.

The electromagnetic converter incorporated in the external unit can be replaced with an electromagnetic converter having no coils. If this is the case an electromagnetic converter having a coil is incorporated in the IC card, and a magnetic card reader is provided within the external unit. The card reader can be of the known type for reading data from the magnetic stripe formed on a card. The electromagnetic head of the card reader reads the output of the electromagnetic converter incorporated in the IC card.

The coil of the electronic converter incorporated in the IC card generates two magnetic fluxes near the center of a read head. These fluxes cancel out each other. Hence, when an electromagnetic head is located at the center of the read coil, the output from the winding on this head will be close to zero. On the other hand, when the head is positioned outside the outermost periphery of the coil, asymmetrical currents will flow through the core halves of the coil. In this case, the output of the head is not zero, but only a portion of the magnetic fluxes generated by the coil is effectively used. Consequently, the signal transfer efficiency is low.

The narrower the gap between the head and the converter, the higher the signal transfer efficiency. An anisotropic conductive film having a thickness of about 0.1 mm is interposed between the head and the converter and connected to the coil so as to supply power to the coil. The gap between the head and the converter cannot be less than 0.1 mm. Unless this gap is reduced, the signal transfer efficiency cannot be sufficiently high.

SUMMARY OF THE INVENTION

Accordingly, it is an object of the present invention to provide a transducer and a method of forming the same, which by means of a simple arrangement can increase intensity of the effective magnetic flux generated so as to improve the signal transfer efficiency.

According to this invention, there is provided a transducer comprising a substrate having a first section for use in forming a coil, and a second section, for use as an electrode, which is thinner than and formed in contact with the first section, thin-film transducer forming means formed on the first section of the substrate, and thin-film electrode means, formed on the second section of the substrate and coupled to the transducer forming means.

According to another aspect of this invention, there is provided a method for forming a transducer comprising a substrate having a first section of a predetermined thickness, and a second section, which is thinner than and formed in contact, with the first section, the method comprising the steps of forming thin-film first transducer forming means on the first section of the substrate; forming thin-film electrode means, coupled to the first transducer forming means; forming an insulating film on the substrate and the first transducer forming means; forming through holes in the insulating film the holes exposing the center portion of the first transducer; and forming a second transducer forming means on the insulating film and in the through holes, the second transducer forming means being a thin-film and electrically connected to the center portion of the first transducer forming means.

BRIEF DESCRIPTION OF THE DRAWINGS

These and other features of the present invention will become more apparent from the following detailed description of an exemplary embodiment thereof, as illustrated in the accompanying drawings, in which:

FIGS. 3, 4, 5, and 6 are perspective views illustrating the steps of the method for forming an electromagnetic converter, wherein:

FIG. 3 shows a coil forming surface and a pad forming surface on a magnetic substrate, FIG. 4 shows a formation of a first spiral coil on the coil forming surface and a connection pad on the pad forming surface of the magnetic substrate shown in FIG. 3, FIG. 5 shows a first insulating film deposited on the coil forming surface and the pad forming surface shown in FIG. 4, and FIG. 6 shows a second spiral coil formed on the first insulating film shown in FIG. 5.

DETAILED DESCRIPTION OF THE PREFERRED EMBODIMENT

An embodiment of the present invention will now be described, with reference to the accompanying drawings.

Figure 1:
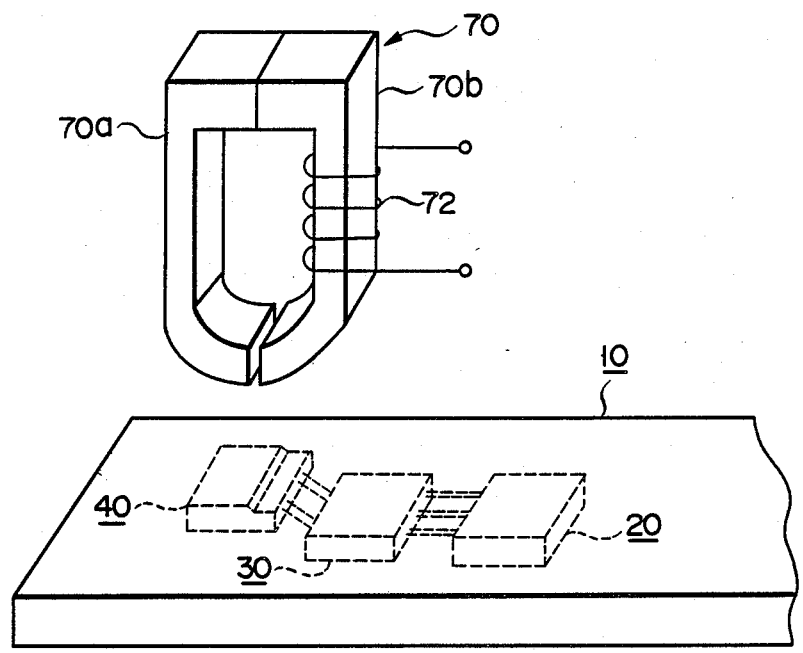
FIG. 1 is a schematic perspective view illustrating an IC card having a built-in transducer embodying this invention and an electromagnetic head.

FIG. 1 is a perspective view of the structure of an IC card having a built-in thin-film electromagnetic converter according to one embodiment of this invention and of the structure of an electromagnetic head. An IC card 10 has a battery 20, an IC memory 30, an electromagnetic converter 40, etc. built therein to, these components being mutually coupled by a conductor. Above the electromagnetic converter 40 lies an electromagnetic head 70 of a reader to be described in a later section.

Referring now to FIGS. 2 through 7, electromagnetic converter 40 will be explained in detail.

Figure 2:
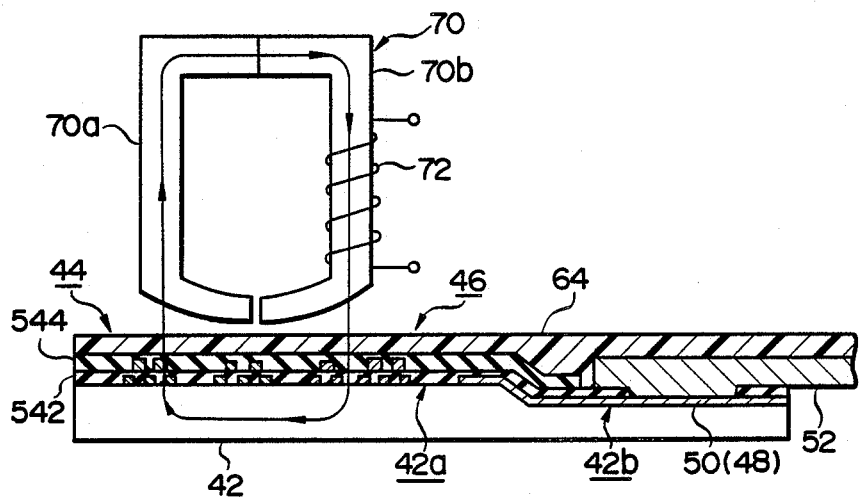
FIG. 2 is a view, partially in cross section, of a thin-film electromagnetic converter adapted to be built into an IC card, and an electromagnetic head.

The dimensions of electromagnetic converter 40 are, for example, 5×5 mm. In the figures, numeral 42 denotes a magnetic substrate which may be formed of a magnetic material such as NiZn ferrite, and which has an insulating characteristic. The top surface of magnetic substrate 42 is divided into a coil forming surface 42a and a stepshaped, pad forming surface 42b which lies at a lower level than the coil forming surface 42a. An electromagnetic conversion coil, constituted by a pair of spiral coils 44 and 46, is formed on the coil forming surface 42a, using a well-known thin-film technique. Spiral coils 44 and 46, which are wound in opposite directions, are coupled to each other and arranged such that electromagnetic head 70 of the reader, as shown in FIGS. 1 and 2, faces a middle portion of each coil. Electromagnetic head 70 is designed such that it can read data unless it deviates from the midpoint between the spiral coils 44 and 46 for a distance longer than 2 mm. Spiral coils 44 and 46 are also coupled, respectively, to thin-film pads 48 and 50, which are formed for electrical connection on the pad forming surface 42b. Connection pads 48 and 50 are coupled to one end of a lead wire 52 formed by wire-bonding, an anisotropic conductive film, etc. The other end of lead wire 52 is coupled to an external circuit for applying a current.

FIGS. 3 through 7 illustrate processes for forming the electromagnetic conversion coil, and connection pads 48 and 50 of the aforementioned magnetic substrate 42.

Figure 3:
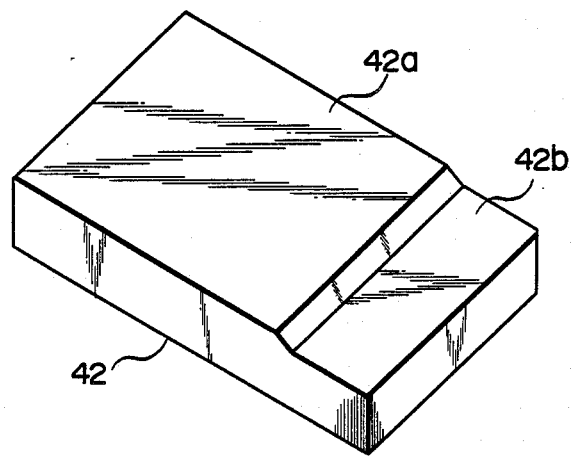

First, as is shown in FIG. 3, coil forming surface 42a and stepped, pad forming surface 42b, which lies at a lower level than surface 42a, are formed on magnetic substrate 42. Magnetic substrate 42 is, for example, 0.3 mm thick at coil forming surface 42a and is 0.2 mm thick at pad forming surface 42b.

Figure 4:
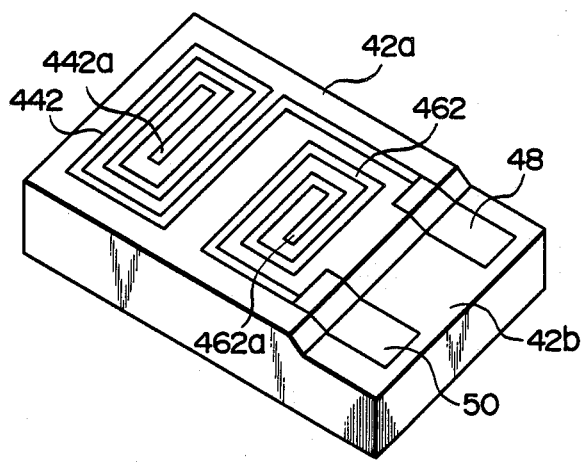

Next, as is shown in FIG. 4, a pair of first spiral coils 442 and 462 are formed, with a predetermined gap therebetween, on coil forming surface 42a. The spiral coils 442 and 462, which are, for example, 2–3 μm thick, constitute a first layer on the coil forming surface 42a and are both wound in the same direction. Coils 442 and 462 are respectively coupled to a pair of connection pads 48 and 50 which are formed on pad forming surface 42b by use of a thin-film technique.

Figure 5:
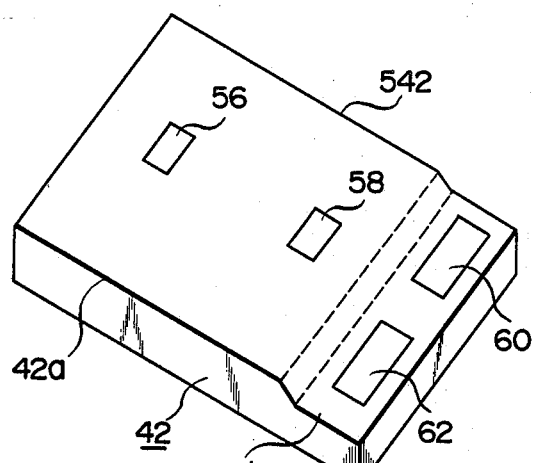
Figure 7:
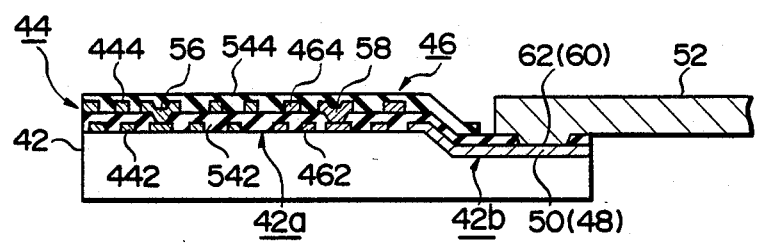
FIG. 7 is a cross-sectional view showing the step of the method for forming an electromagnetic converter, in which the second insulating film is deposited on the second spiral coil formed on the coil forming surface, as shown in FIG. 6, and a lead wire is connected via a through hole on the pad forming surface.

As is shown in FIGS. 5 and 7, a first insulating film 542, for example, a photoresistor, with a thickness of, say, 10 μm is deposited on one surface of magnetic substrate 42, i.e., over the top surfaces of spiral coils 442 and 462. Through holes 56 and 58 are formed in those portions of the first insulating film 542 which are in contact with tip portions 442a and 462a of spiral coils 442 and 462, while through holes 60 and 62 are formed in those portions of the film 542 where these coils are coupled to connection pads 48 and 50.

Figure 6:
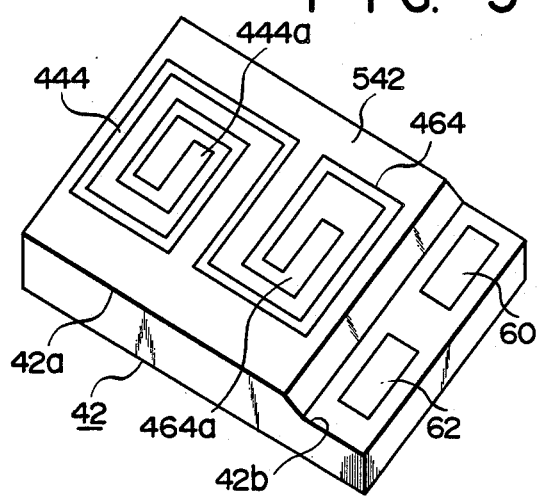

As is shown in FIGS. 6 and 7, a pair of second spiral coils 444 and 464 are formed on the first insulating film 542, with a predetermined gap therebetween, in association with the through holes 56 and 58. Like the first spiral coils 442 and 462, spiral coils 444 and 464, which are, for example, 2–3 μm thick, are both wound in the same direction, and constitute a second layer on the first insulating film 542. Similarly, the second spiral coils 444 and 464 are formed on pad forming surface 42b, by use of a thin-film technique.

Center portions 444a and 464a of the second spiral coils 444 and 464 are coupled to the center portions 442a and 462a of the first spiral coils 442 and 462, through their respective through holes 56 and 58. Accordingly, the second spiral coils 444 and 464, together with the first spiral coils 442 and 462, constitute a pair of mutually-coupled spirals 44 and 46. A second insulating film 544 is deposited on the second spiral coils 444 and 464 and over the first insulating film 542. Like the first insulating film, the second insulating film 544 is 10 μm thick.

Lead wire 52, as shown in FIG. 7, is coupled to through holes 60 and 62 which are coupled to pads 48 and 50 formed on pad forming surface 42b. This lead wire 52 is formed of, for example, a 0.1 mm thick anisotropic conductive film, and is coupled to the through holes by thermal pressure bonding. As a result, the thickness of substrate 42 on the side of pad forming surface 42b plus lead wire 52 is still less than that of the substrate on the side of coil forming surface 42a. As a result, the lead wire does not protrude above the second insulating film 544. Thus, the gap between the head 70 and the converter 40 can be reduced.

As is shown in FIG. 2, an over sheet 64 having a thickness of, for example, 0.1 mm, is deposited on the second insulating film 544 and lead wire 52. In addition to being formed over electromagnetic converter 40, over sheet 64, which serves as a to protection for IC card 10, is also formed over the entire top and bottom surfaces of IC card 10. (In the figure, only that part of over sheet 64 covering the top surface of IC card 10 is shown.)

When, in the electromagnetic converter 40 constituted thus, a current is supplied to spiral coils 44 and 46, which are mutually coupled through lead wire 52. Coils 44 and 46 generate magnetic fluxes, in opposite directions with respect to magnetic substrate 42, in accordance with the direction of the current. The magnetic fluxes generated by spiral coils 44 and 46 circulate through core halves 70a and 70b of electromagnetic head 70 from spiral coil 44 to spiral coil 46, as indicated by the arrow in FIG. 2, for instance. Consequently, when the intensity of the magnetic fluxes of spiral coils 44 and 46 of magnetic substrate 42 change with time, a voltage is induced, and a winding 72 on head 70 reads data. As has been described, the magnetic fluxes of opposite phases, which have been generated by spiral coils 44 and 46, extend from the centers of coils 44 and 46, in the direction perpendicular to magnetic substrate 42. Therefore, these magnetic fluxes do not cancel out each other within the core halves of the electromagnetic head.

The coil forming surface 42a and electromagnetic head 70 have the following relationship with regard to their mutual distance and a reproduced output appearing on the head's winding 72. Since the electromagnetic head 70 is separated from coil-forming surface 42a, the reproduced output is reduced. For instance, the reproduced output attained with an interval of 0.1 mm between the coil forming surface 42a and head 70 is twice that attained with a 0.2 mm interval. That is, the closer the head 70 is moved to coil forming surface 42a, the greater the reproduced output. It is therefore understood that, when head 70 comes as close to coil forming surface 42a (actually, the top surface of over sheet 64) as possible, the best reproduced output can be attained.

According to the electromagnetic converter embodying this invention, which has connection pads 48 and 50 provided on stepped, pad forming surface 42b lying lower that coil forming surface 42a, the coil forming surface 42a can be kept lower than pad forming surface 42b even with the use of an anisotropic conductive film (e.g., 0.1 mm) as a lead wire. With over sheet 64 deposited, the interval between coil forming surface 42a and head 70 does not depend on the thickness of the pad forming surface, and can be made smaller as compared with the conventional case where the coil forming surface and pad forming surface are formed on the same plane. In other words, with the use of the electromagnetic converter of this invention, which has a stepped portion at the lead wire section (connection pad forming surface) lower than the coil forming surface, the electromagnetic head can be positioned closer to the coil forming surface as compared with the conventional electromagnetic converter having the thinnest material available as the lead wire.

As explained above, the use of a magnetic substrate with a coil forming surface different in thickness from a connection pad forming surface, can improve a reproduced output and can ensure the effective use of a magnetic flux generated by the coils. In addition, since the electromagnetic head can be positioned significantly closer to the electromagnetic converter, the signal transfer efficiency can be improved.

Although the above embodiment has been explained with the use of a magnetic substrate, it is not limited to this type. For instance, the substrate may be of a non-magnetic material. More specifically, a soft magnetic thin-film, about 10 μm thick, is formed on the non-magnetic substrate by sputtering, and this soft magnetic thin-film can be used as a magnetic layer. In this case, the same effect as is attained by the use of the magnetic substrate can be expected.

Further, in the above embodiment, insulating films are formed on the spiral coils; however, this embodiment is not limited to this particular structure. For instance, insulating films serving as an over sheet may be formed, or no insulating films need to be formed on the spiral coils.

As has been explained above, this invention can provide an IC card with a thin-film electromagnetic conversion function, which can increase an effective magnetic flux generated with a simple arrangement so as to improve the signal transfer efficiency.

What is claimed is:

1. A transducer for performing signal conversion to read out data, said transducer comprising:
  a substrate having a first section for use in forming a coil, and a second section for use as an electrode, the second section being thinner than and formed in contact with said first section;
  thin-film transducer means formed on said first section of said substrate; and
  thin-film electrode means, formed on said second section of said substrate, coupled to said transducer means, and adapted to have lead wires electrically and mechanically connected thereon, said second section of said substrate being thinner than said first section by at least the thickness of said lead wires.

2. A transducer according to claim 1, wherein said electrode means is coupled to a semiconductor memory for storing data signals.

3. A transducer according to claim 2, wherein said electrode means is coupled to said semiconductor memory by means of an anisotropic conductive film.

4. A transducer according to claim 3, wherein said substrate is made of a magnetic material.

5. A transducer according to claim 3, wherein said substrate is made of a non-magnetic material.

6. A transducer according to claim 4 or 5, wherein said transducer means comprises an electromagnetic conversion coil constituted by a pair of spiral coils both wound in the same direction and coupled to each other.

7. A method of forming a transducer for performing a signal conversion to read out data, which comprises a substrate having a first section with a predetermined thickness, and a second section, thinner than and formed in contact with said first section, said method comprising the steps of:
  forming thin-film first transducer means on said first section of said substrate, and forming on said second section thin-film electrode means coupled to said first transducer means and adapted to have lead wires electrically and mechanically connected thereon, said second section of said substrate being thinner than said first section by at least the thickness of said lead wires;
  forming an insulating film on said substrate and said first transducer means, and forming through holes in the insulating film, said through holes exposing a center portion of said first transducer means; and
  forming a second transducer means on said insulating film and in said through holes, said second transducer means being a thin-film and electrically connected to the center portion of said first transducer means.

8. A method according to claim 7, wherein said electrode means is coupled to a semiconductor memory for storing data signals.

9. A method according to claim 8, wherein said electrode means is coupled to said semiconductor memory by means of an anisotropic conductive film.

10. A method according to claim 9, wherein said substrate is made of a magnetic material.

11. A method according to claim 9, wherein said substrate is made of a non-magnetic material.

12. A method according to claim 10 or 11, wherein said first and second transducer means comprise a pair of spiral coils both wound in the same direction and coupled to each other.

13. A method according to claim 12, wherein said coupled pair of spiral coils comprise a first spiral coil, as a first layer, serving as said first transducer means, and a second spiral coil, as a second layer, serving as said second transducer means, and center portions of said first and second spiral coils are coupled by means of said through hole.

* * * * *